Feb. 6, 1923.
N. DEMERS
APPARATUS FOR SANDPAPERING FLANGED SPOOLS
Filed Nov. 19, 1920
1,444,668
7 sheets-sheet 4
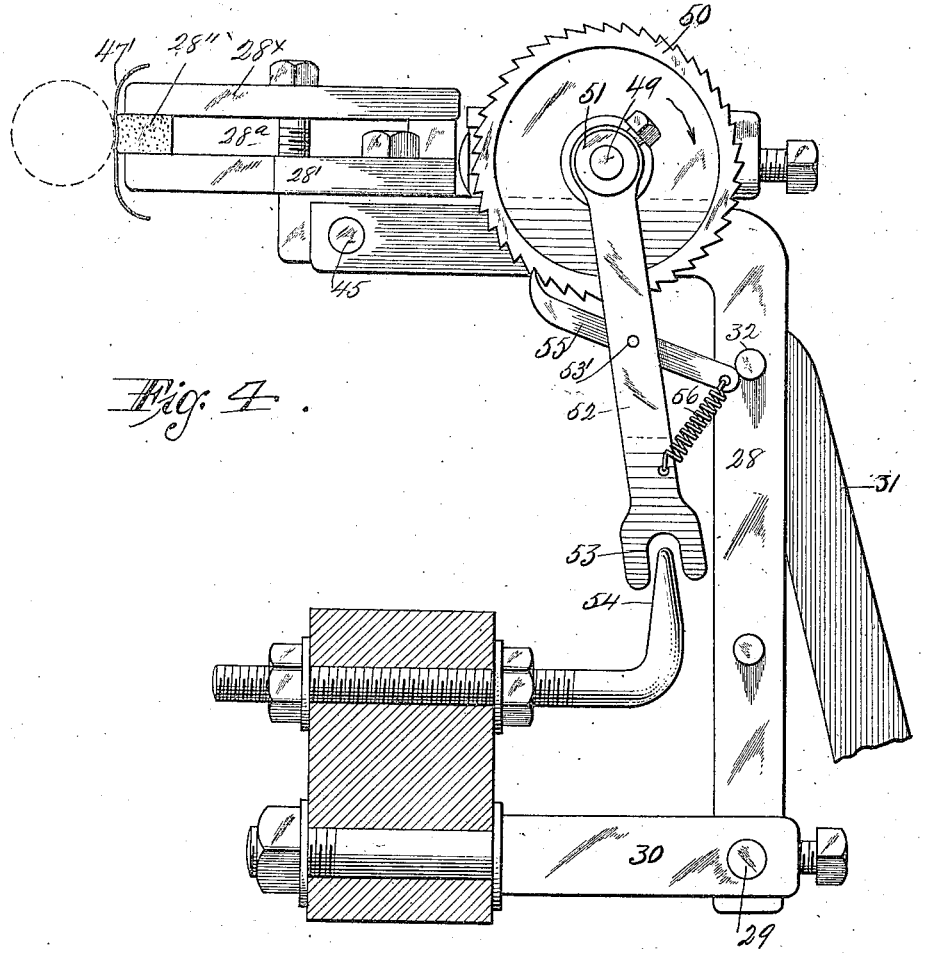
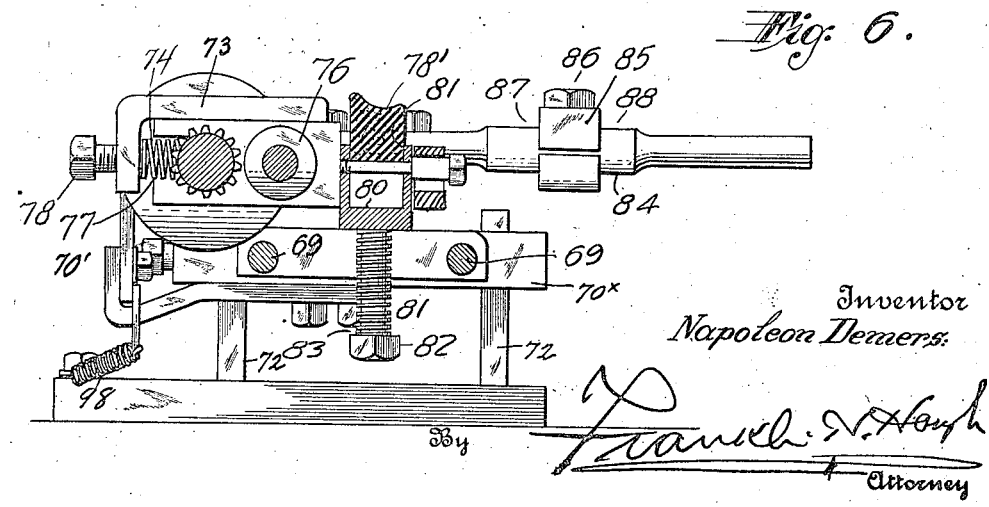
Inventor
Napoleon Demers
By
Attorney

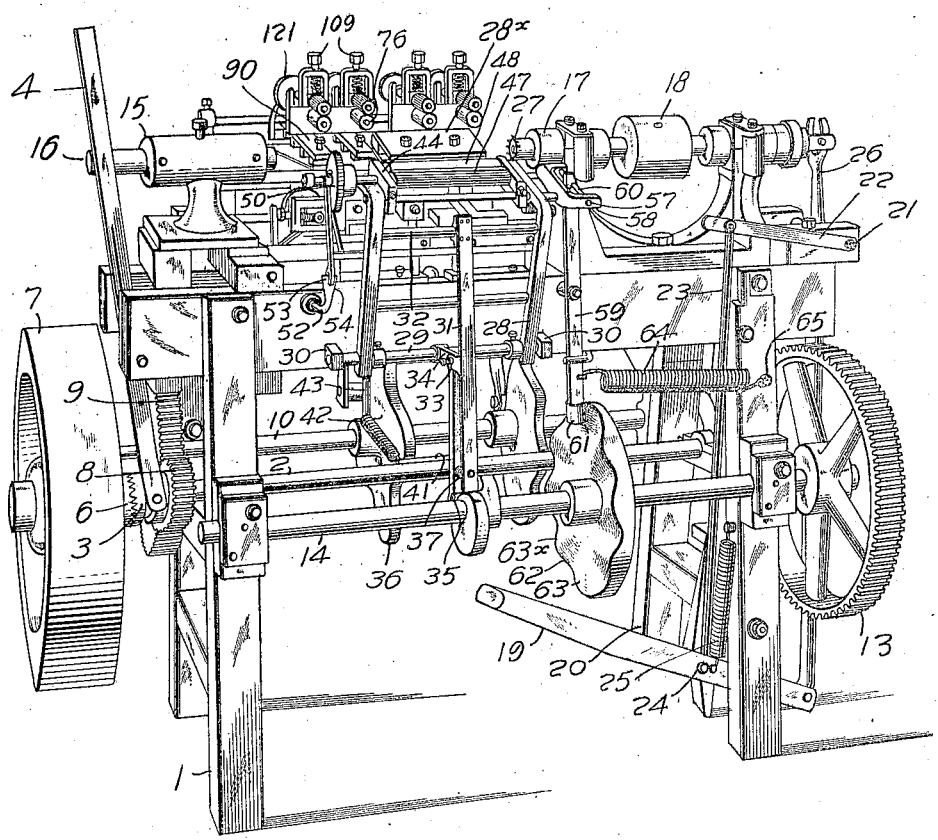

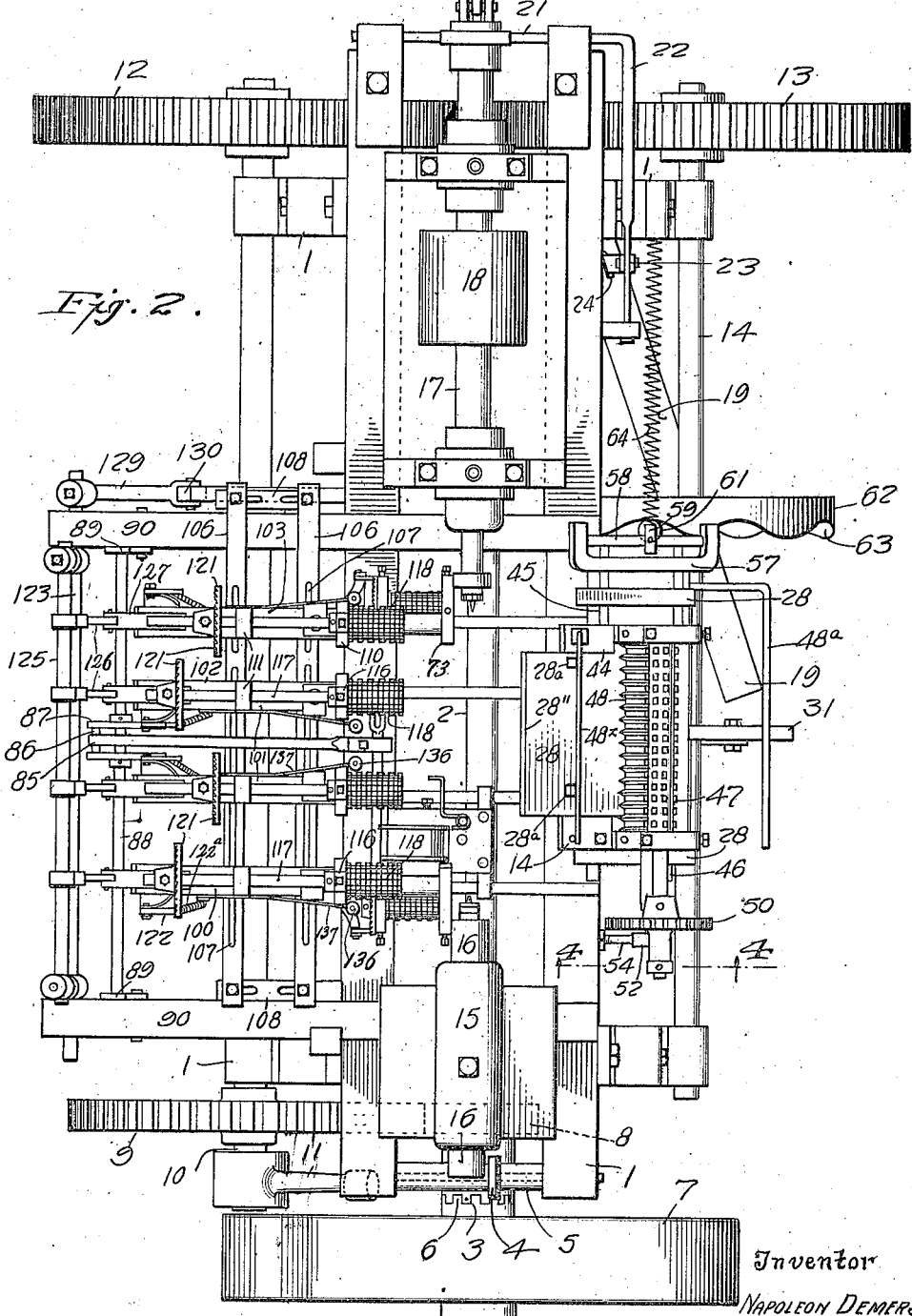

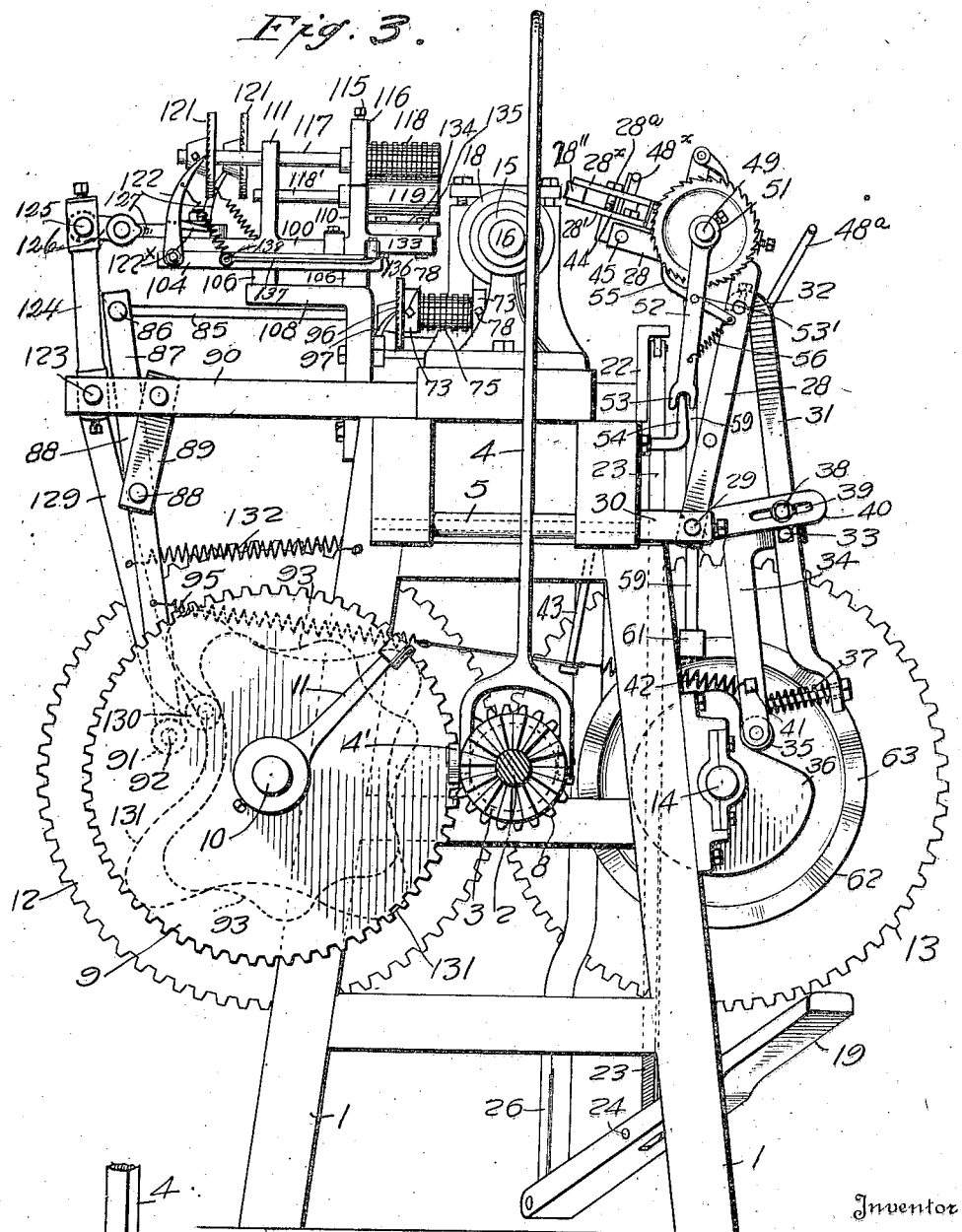

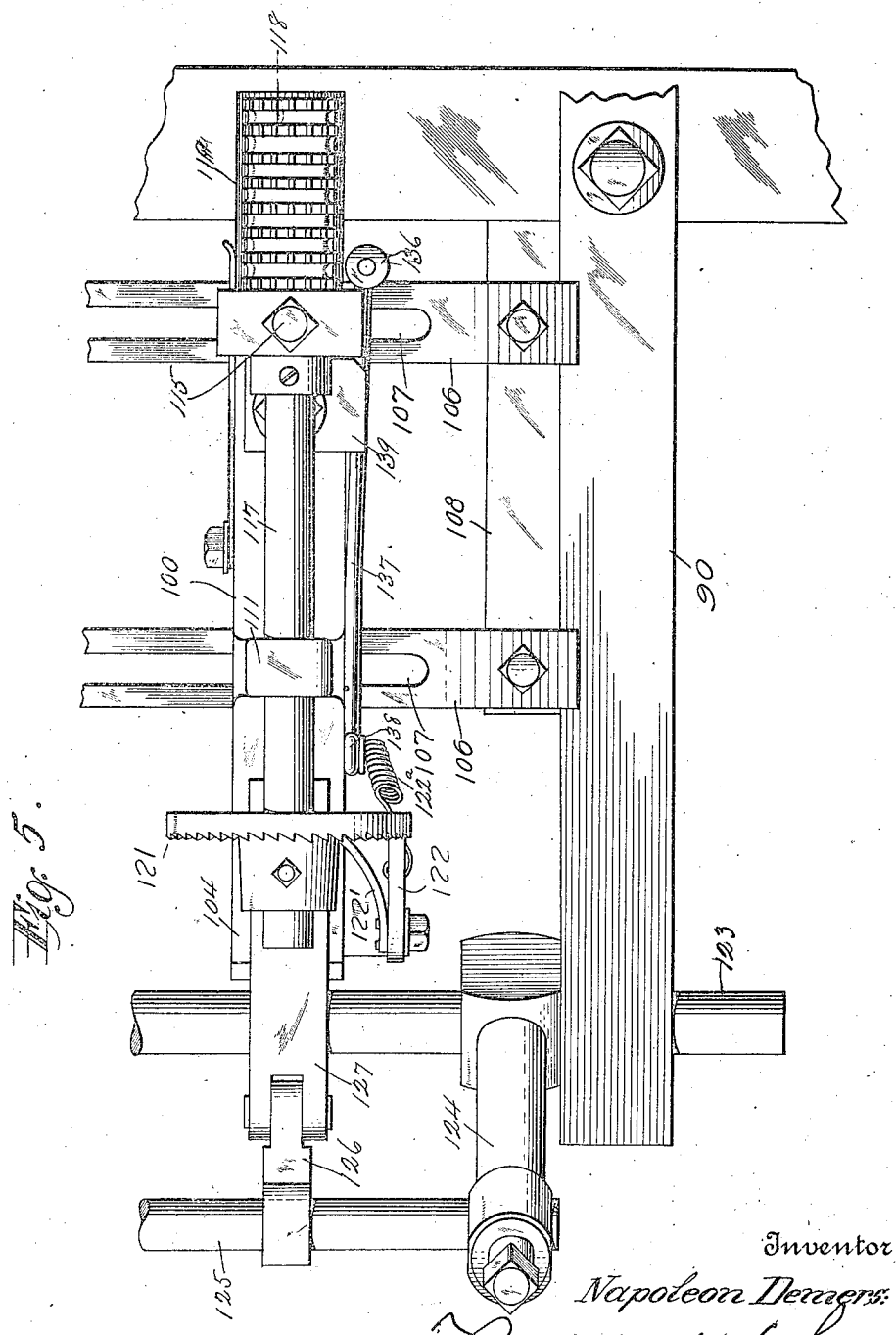

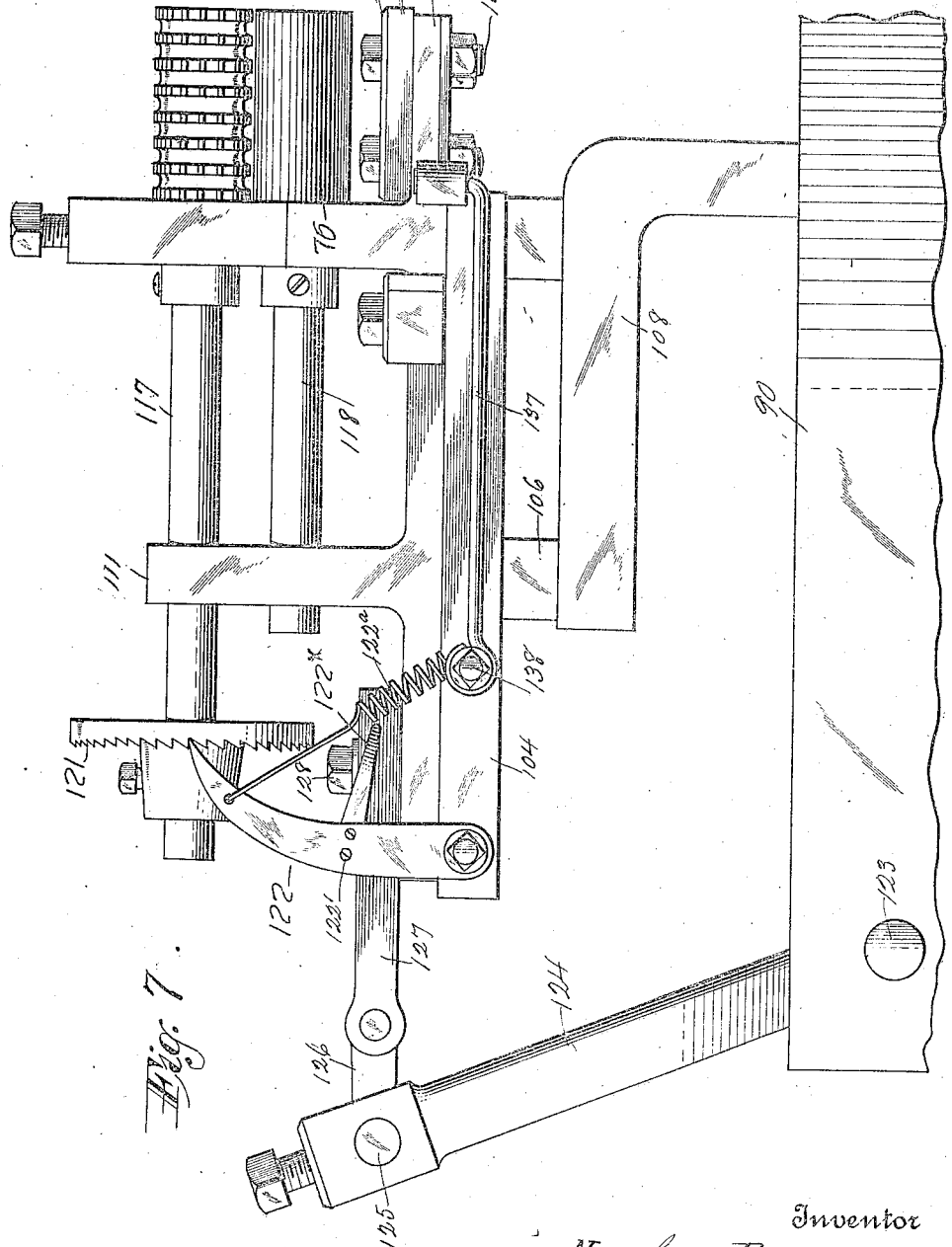

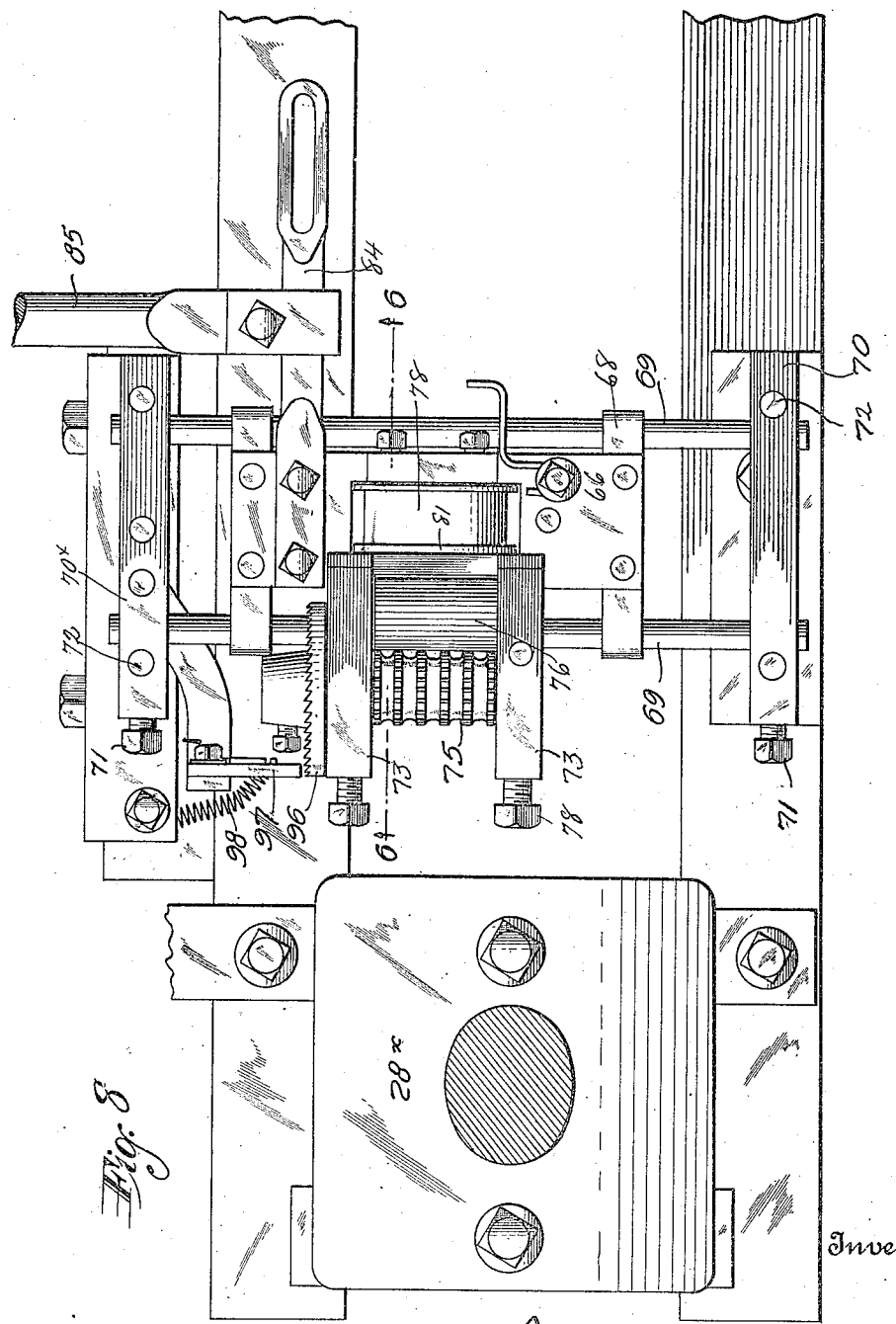

Patented Feb. 6, 1923.

1,444,668

UNITED STATES PATENT OFFICE.

NAPOLEON DEMERS, OF EAST SHERBROOKE, QUEBEC, CANADA.

APPARATUS FOR SANDPAPERING FLANGED SPOOLS.

Application filed November 19, 1920. Serial No. 425,213.

*To all whom it may concern:*

Be it known that I, NAPOLEON DEMERS, a subject of the King of England, residing at East Sherbrooke, P. Q., Canada, have invented certain new and useful Improvements in Apparatus for Sandpapering Flanged Spools; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in apparatus for sand papering flanged spools, and comprises a mechanism whereby the cylindrical and flanged portions are simultaneously sand papered.

The invention comprises a simple and efficient apparatus of this nature having various details of construction, combination and arrangement of parts which will be hereinafter fully described, shown in the accompanying drawings and then specifically defined in the appended claims.

My invention is illustrated in the accompanying drawings which, with the numerals of reference marked thereon, form a part of this application, and in which:

Figure 1 is a front perspective view of the machine.

Figure 2 is a top plan view.

Figure 3 is an end elevation.

Figure 4 is a vertical sectional view taken on line 4—4 of Figure 2.

Figure 5 is an enlarged fragmentary plan view of one of the several rollers and associated parts.

Figure 6 is a fragmentary detail view on line 6—6 of Figure 8.

Figure 7 is a fragmentary detail view in end elevation of one of the pairs of co-acting rollers and associated parts.

Figure 8 is a fragmentary view of a part of the mechanism in top plan, certain parts being broken away.

Figure 9 is a detail perspective view of the lower end of the shipping lever.

Figure 10 is a top plan view of a pair of the carriages upon which are mounted the support of the rollers, the rollers being omitted to show the movement of the carriage, the carriage being in extended or operative position in full lines and in retracted or inoperative position in dotted lines.

Reference now being had to the details of the drawings by numerals:

1 designates the frame of the machine, having mounted thereon a driven shaft 2, with a sliding clutch sleeve 3 splined thereto, which is actuated back and forth on the shaft through the medium of a forked lever 4 pivoted at 5 on the frame of the machine. Said sleeve has teeth designed to engage teeth 6 on the hub portion of a pulley 7 which is loosely journaled on the shaft and which is adapted to be driven continuously from any source of power.

A pinion wheel 8 is keyed to said shaft and is in mesh with a gear wheel 9 keyed to a counter shaft 10, journaled in suitable bearings in the frame of the apparatus. An arm 11 fixed to the end of the shaft 10, at each revolution of the latter, is designed to strike against the cam 4' on the lever 4 which actuates the clutch sleeve to throw same out of mesh with the pulley 7. Keyed to said shaft 10 is a second gear wheel 12, which is in mesh with a gear wheel 13 rotating with a third shaft 14, also journaled in the frame 1.

Mounted on the top of the frame of the machine is a tail stock 15 in which is mounted a longitudinally movable spindle 16 adapted to engage the bore in one end of a spool to be sand papered.

An arbor 17, mounted in suitable bearings in the frame, has a pulley 18 keyed thereto and to which power is belted for imparting a rapid rotary motion to the spool to be sand papered, the revolutions being in the neighborhood of 2500 per minute. Said arbor has a longitudinal movement within the bearings and is actuated in such movement by a tread lever 19, pivoted to the lower end of a rod 20, which is fixed at its upper end to the frame. A rock shaft 21 is journaled in suitable bearings in the frame and has an arm 22 projecting at right angles therefrom, which is pivoted at one end of the bar 23, which, at its lower end, is pivoted to the tread lever at 24. A spring 25 is fastened at its lower end to the tread lever and its upper end to the frame, and tends to return the lever 19 to its normal position, after its end is released by the person operating the machine.

Fixed to the rock shaft 21 is an arm 26, the upper portion of which is pivotally connected to the end of said arbor to move the same back and forth, to cause the spool to be gripped and released. The spindle end of the mandrel has teeth 27 for engagement with the end of a spool, to give the latter a rotary movement while it is being sand papered.

A bracket 28 of general inverted L-shape is fulcrumed to oscillate on a horizontally disposed rod 29 which is mounted in suitable lugs 30, projecting from the side of the frame. The bracket 28 is oscillated through the medium of the lever 31 which, at its upper end, is fastened to a cross rod 32 of the bracket, and is pivoted at 33 to a curved bar 34 carrying an anti-friction roller 35, which is designed to ride on the circumference of the cam wheel 36 keyed to the shaft 14.

The lever 31 has interposed between its lower end and the lower portion of said bar 34 a spring 37, which tends to yield to compensate for spools of varying diameters.

As an auxiliary means of adjustment, the lever 31 is provided with a screw 38, which passes through a slot 39 in a bar 40, fastened at its inner end to the rod 29, and when the screw is tightened it will hold the lever and slotted bar in adjusted relative positions. This adjustment of the machine adapts it to operate on spools of different diameters, as will be readily understood.

Projecting from the curved bar 34 is a pin 41, and 42 is a coiled spring fastened at one end to said pin, and its opposite end to a depending pin 43 projecting from the frame of the machine, and whereby the anti-friction rollers at the lower end of the lever 31 may be held at all times yieldingly against the circumference of the cam wheel 36.

Said bracket has journaled in its upper and inwardly extending part a longitudinally movable carriage 44, provided with two parallel rods 45 and 46, which slide through apertures in the upper portion of the bracket. Said carriage also has two rollers 47 and 48, journaled therein. The roller 47 has a spindle end 49 to which a ratchet wheel 50 is keyed, and the circumference is corrugated, and tends to grip frictionally against the roller 48 a strip of sand paper 47' and feed same forward between the two rollers with a step by step movement.

A hub 51 is journaled on the end of the spindle 49 and has an arm 52 with its lower end bifurcated as at 53 and which receives the widened upper end of the arm 54, fastened to the frame of the machine, and serving to detain the end of the arm 52 as the latter moves back and forth with the carriage. A pawl 55 is pivoted to said arm 52 at 53', and a spring 56 fastened to one end of the pawl, holds its other end in engagement with the teeth of the ratchet wheel 50.

A cross bar 57 connects the ends of the rods 45 and 46 beyond the end of the carriage opposite the ratchet feed, described, and 58 is a rod fastened to and extending between the offset ends of said bar 57. 59 is a lever engaging at its upper end, sliding upon the rod 58, as the bracket is oscillated upon its pivoted rod 29. The lower end of the lever 59 carries an anti-friction roller 61, which is held in contact with the face of a disk 62 near its periphery, and to ride upon the cam contour 63. A coiled spring 64 is fastened at one end to the lever 59 below its pivot, and its other end is fastened to a pin 65 on the frame, and tends to hold the roller 61 against the face of the disk and its cam contour, for the purpose of giving the carriage intermittent reciprocating movements.

The oscillating bracket 28 has a clamping plate $28^x$ thereon, between which and a fixed plate 28' of said carriage 44, a block 28'' of rubber is clamped by means of screws $28^a$ passing through registering apertures in the two plates 28' and $28^x$. Over the projecting edge of the rubber block, a strip of sand paper 47', see Fig. 4 is fed between the two rollers 47 and 48. The strip of sand paper 47' is held in position to pass over the edge of the rubber block by means of the angled rod $48^x$, which is fastened to one end of the carriage 44, the coil of the paper being loosely supported on an angled member 48, fastened to the oscillating bracket.

The mechanism for the purpose of sand papering the flanges of the spools comprises two reciprocating carriages, see Figs. 6 and 8, designated by numeral 66 of identical construction, each being provided with two cross pieces 68, apertured to receive the horizontally disposed parallel rods 69, which are supported in the adjustable bars 70 and $70^x$, and held at different elevations by the set screws 71, mounted in threaded holes in the ends thereof, the ends of said screws 71 designed to frictionally engage the pins 72, on which the bars 70 are slidable.

This adjustment feature is for adapting the organization for sand papering flanges of greater or less diameters. The rear ends of the rod 69 are mounted in the bar $70^x$, which is held in different adjusted positions by screws 70', which are tapped into the frame and which pass through slots in said bars.

Each carriage has projecting from its outer edges, arms 73 slotted at their outer ends as at 74 to receive and journal the spindle ends of the roller 75, the circumference of which is provided with serrations, tending to feed frictionally a strip of sand paper between same and a smooth faced roller 76, the spindle ends of which are journaled in holes in said arms. The roller 76 is idle and the roller 75 is held yieldingly thereagainst by the springs 77. Screws 78 mounted in threaded apertures in the L-shaped projections of said arm, bear against the outer ends of the springs 77 and regulate their tension.

Each carriage has mounted thereon a block 78' of yielding material, such as rubber, which has its upper edge contoured complementarily to the edge of the flange of a spool and between which grooves and the spool flange, said strip of sand paper passes. Said block 78' is mounted on a bar 80, having flanges 81 extending up through an opening in the carriage 66, the bar being supported yieldingly on coiled springs 81', held upon screws 82, the lower ends of the coiled springs bearing against the heads of the screws. A bar 84 connects the rear ends of the carriage 66, and 85 is a rod fastened at its inner end to said bar 84, and its outer end is pivotally connected to a pin 86, held in apertures in the upper ends of two parallel bars forming the lever 87 which are fixed to the shaft 88 upon which they are mounted. Said shaft 88 is held in apertures in the hangers 89, fastened to a projecting arm 90 of the frame.

An anti-friction wheel 91 is journaled on a pin 92 held between the lower ends of the bars of the lever 87, and is held by a spring 95, yieldingly against the periphery of a cam 93 keyed to the shaft 10.

To impart a step by step feeding movement to the strip of sand paper, passing between the rollers 75 and 76, a ratchet wheel 96 is provided, which has teeth upon its rear face, and 97 is a pawl pivoted at its lower end on the frame, and is held by a spring 98 to engage said teeth of the ratchet wheel 96, and to impart an intermittent rotary movement to the roller 75 when the carriage 66 moves rearward, at a moment when the strip of sand paper is not operating against the edges of the flanges of the spools.

The mechanism for sand papering the opposite faces of the flanges of the spools, comprises four similar carriages designated respectively by numerals 100, 101, 102 and 103, see Figs. 1, 3, 5 and 7 each mounted to have reciprocating movement longitudinally upon a plate 104 slotted as at 105. The several carriages 100 to 103 inclusive are adjustably supported upon two stationary bars 106, which are also longitudinally slotted as at 107, for fastening the carriages in adjusted positions. The bars 106 are fastened to arms 108 projecting rearwardly from the frame.

The carriages 100 to 103 inclusive have upright extensions 110 and 111 spaced apart, and the upper end of the extension 110 is slotted as at 112 see Fig. 1 to receive a bearing boxing 113, having a yielding movement through the medium of springs 114, bearing at their lower ends against the boxings, and at their upper ends against tension screws 115, mounted in threaded apertures in the yokes 116 fastened at their ends to the opposite edges of said extensions. The boxes in the slots of the extensions 111 are relatively stationary. Shafts 117 are journaled in the bearing boxes of each extension, and to the inner end of each shaft 117 is fixed a roller 118, the periphery of which is serrated. A second shaft 118' is journaled in apertures in the extensions, and to the forward end of each is fastened a roller 119 with smooth periphery. Between the two rollers, one journaled above the other on said extensions, a strip of sand paper not shown passes. A ratchet wheel 121 is fastened to the outer projecting end of each shaft 117, and a pawl 122 is pivoted at its lower end to the stationary slotted plate 104 upon which the carriage is mounted, and a spring 122$^a$ holds said pawl yieldingly against the teeth on the outer face of said ratchet wheel 121, when the carriage on which the ratchet wheel is carried is moved backward by a mechanism which will be presently described.

Said pawl 122 has a finger 122$^x$ rigidly connected thereto by means of screws 122' and when the carriage is moved forward the ratchet wheel 121 carried thereby will draw away from the pawl, and said finger being drawn by the spring 122$^a$ attached to the pawl is mounted so that the end of the finger will strike against the top of the adjacent carriage. It will be seen that the pawl will be thus held yieldingly in the path of the ratchet wheel as the latter returns again to the outer limit, the feed being effected on the outer movement of the carriage, the pawl oscillating on its pivot as it is pushed by the ratchet wheel which engages it.

Journaled in the arms 90 is a rock shaft 123, having arms 124 rigidly attached thereto, and which at their upper ends have holes embracing the fixed rod 125. Links 126 have each a hole in their outer ends embracing the rod 125, and the forward end of each link is pivotally connected to a bar 127 which is slotted to adjustably accommodate a screw 128 tapped into the outer end of the carriage having said extensions.

Fixed to a projecting end of said rock shaft 123 is an arm 129 having an anti-friction wheel 130 journaled in its lower forked end which is held by a helical spring 132 yieldingly against the undulating periphery of a cam 131, keyed to the shaft 10 before referred to.

Each of the carriages 100 to 103 inclusive, has a forwardly projecting portion 133 extending under the rollers 118 and 119 and a plate 134 is held to each extension 133 by means of screws 134', and clamps a block of rubber 135 therebetween with a part of the latter extending beyond the margin of the extension, and over which projecting portions of the rubber a strip of sand paper is fed by the rollers with a step by step movement. Each of the carriages is so mounted as to have a slight lateral pivoting movement on the screw 128 which connects same to said slotted bar 127, this lateral movement being provided so that the carriages in pairs may be moved towards each other to bring the two strips of sand paper against the opposite faces of the flanges of the spool being operated upon.

Anti-friction rollers 136, one on the forward angled end of each resilient rod 137, which latter is fastened at 138 to the side of the slotted plate 104, and 139 designates an angled member, which is adjustably held over the edge of the carriage 100, with a portion thereof in the path of said roller 136, and affording means whereby, as the carriage is fed forward, said projecting portion will contact with the roller 136 and cause the resilient rod on which it is mounted to yield, and its tension throw the forward end of the carriage to the left. When the carriage 100 returns toward its outer limit and after said member 139 passes past the anti-friction roller 136, a spring 140, fastened at one end to the edge of the plate 104 opposite the one to which said resilient rod is attached and which spring 140 is put under tension by the lateral swinging movement of the carriage 100, will return the latter to its normal position.

By the construction shown, the forward ends of the carriages 100 to 103 will swing towards each other, while the forward ends of the inside carriages will swing away from each other then causing the strips of sand paper to be simultaneously held under pressure against the opposite faces of the flanges of the spool being sand papered.

In operation, the driving pulley is loosely mounted on the shaft 2, the latter being normally at rest. A spool to be sand papered is placed with one end against the spindle at the end of the tail stock, and the spindle at the end of the arbor is moved into contact with the opposite end of the spool, by the operator depressing the tread lever, it being understood that the arbor is in continuous rotation, and causing the spool to rotate therewith. The operator then actuates the clutch lever to throw the loosely mounted pulley into gear with the clutch sleeve on the shaft 2, causing the latter to rotate preferably at the rate of ten revolutions per minute, while the spool rotates at 2500 revolutions per minute. During the cycle of the machine, when the various cam members come into action, the several carriages with strips of sand paper held thereby over the edges of the rubber blocks, will be moved towards the rapidly rotating spool, the strip of sand paper which is fed between the two rollers 47 and 48, being moved by the swinging rack, so that the sand paper will contact with the cylindrical or barrel part of the spool, and the carriage in which said rollers 47 and 48 are mounted, is given a rapid reciprocating movement while the strip of paper is held yieldingly under pressure aganist the spool.

The rack 28 is moved forward by the cam 36 and returned by the spring 42, and a slight reciprocating movement is imparted to the carriage carrying the rollers 47 and 48, through the medium of the cam projections 63 on the disk $63^x$.

The cam wheel 93 at each revolution will cause the two sets of carriages carrying the rollers 75 and 76 to be moved back and forth, while holding a strip of sand paper. The opposite faces of the flanges of the spool are sand papered by the strips of sand paper gripped between the rollers 117 and 119, and which are given back and forth reciprocating movements, through the medium of the cam and the arm 129, and the anti-friction wheel carried thereby, which latter is held against the periphery of the cam 131 by the coiled spring 132.

The initial forward movement of the several carriages 100 to 103 inclusive is given thereto by the elongated part of the periphery of the cam 131, and as the carriages 100—103 move forward, the angled plates fixed thereto will come into contact with the anti-friction rollers 136, journaled on the resilient rods 137, the latter causing the forward ends of the two outside carriages 100 and 103 to swing towards the opposite ends of the spool, while the inside carriages 101 and 102 will swing in the opposite directions or towards the inner faces of the flanges of the spool. When the strips of sand paper are held frictionally by the rollers against the rapidly rotating spool, the several carriages 100—103 and rollers thereon, are given a succession of rapid reciprocations, through the medium of the series of cam projections on the wheel 131.

After the cam shafts have each made a single revolution and which comprises a cycle of operation the various carriages are returned to their normal positions and the shaft 2 comes to rest by the arm 11 striking against the clutch sleeve splined thereon, throwing the latter out of mesh with the hub portion of the driving pulley.

What I claim to be new is:

1. A machine for sand papering flanged spools, comprising a frame with means thereon for holding and rapidly rotating a spool, carriages, means for moving the latter towards the rotating spool, and means upon the carriages for holding strips of sand paper simultaneously against the barrel portion of the spool, the opposite faces and the edges of the flanges thereof.

2. A machine for sand papering flanged spools, comprising a frame with means thereon for holding and rapidly rotating a spool, carriages, means for moving the latter towards the rotating spool, and means upon the carriages for holding strips of sand paper, and means for feeding strips of sand paper, and members on the carriages for holding the sand paper strips simultaneously against the barrel portion, the opposite faces of the flanges and the edges of the spool.

3. A machine for sand papering flanged spools, comprising a frame with means thereon for holding and rapidly rotating a spool, carriages, cam actuated mechanism for moving the carriages toward the rotating spool, and means on the carriages for holding strips of sand paper simultaneously against the barrel portion, the opposite flanges and the edges of the spool.

4. A machine for sand papering flanged spools, comprising a frame with means thereon for holding and rapidly rotating a spool, carriages, cam actuated mechanism for moving the carriages toward the rotating spool, and means on the carriages for holding strips of sand paper simultaneously against the barrel portion, the opposite flanges and the edges of the spool, and means for imparting an intermittent feed to the strips of sand paper.

5. A machine for sand papering flanged spools, comprising a frame with means thereon for holding and rapidly rotating a spool, carriages, cam actuated mechanism for moving the carriages toward the rotating spool, and means on the carriages for holding strips of said paper simultaneously against the barrel portion, the opposite flanges and the edges of the spool, rollers upon the carriages adapted to impart an intermittent feed to the strips of sandpaper.

6. A machine for sand papering flanged spools comprising a frame with means thereon for holding and rapidly rotating a spool, carriages, cam actuated mechanism for moving the carriages toward the rotating spool, and means on the carriages for holding strips of sand paper simultaneously against the barrel portion, the opposite flanges and the edges of the spool, rollers arranged in pairs on each carriage, and means for imparting intermittent rotary movements to said carriages as they return to their starting positions.

7. A machine for sand papering flanged spools comprising a frame with means thereon for holding and rapidly rotating a spool, a swinging rack, a carriage thereon, horizontally movable carriages, means on the carriages for holding strips of sandpaper, and cam mechanism for causing the horizontally movable carriages and the rack to move towards the rapidly rotating spool.

8. A machine for sand papering flanged spools, comprising a frame with means thereon for holding and rapidly rotating a spool, a swinging rack, a carriage thereon, horizontally movable carriages, means on the carriages for holding strips of sandpaper, and cam mechanism for causing the horizontally movable carriages and the rack to move towards the rapidly rotating spool, and means for imparting a longitudinal reciprocating movement to the carriage on said rack.

9. A machine for sand papering flanged spools, comprising a frame with means thereon for holding and rapidly rotating a spool, a swinging rack, a carriage thereon, horizontally movable carriages, means on the carriages for holding strips of sandpaper, and cam mechanism for causing the horizontally movable carriages and the rack to move towards the rapidly rotating spool, and means for imparting a longitudinal reciprocating movement to the carriage on said rack, and ratchet feeding means for imparting intermittent movements to the rollers as the carriages return to their starting positions.

10. A machine for sand papering flanged spools, comprising a frame with means for holding and rapidly rotating a spool, a swinging rack, a movable carriage thereon, rollers upon the carriage between which a strip of sandpaper is adapted to be fed, a ratchet wheel fixed to one roller, a pawl engaging said wheel, horizontally movable carriages and cam mechanism for actuating said rack and carriages, and means on the latter for holding strips of sandpaper against the barrel portion, the opposite faces and the edges of the flanges of the spool simultaneously.

11. A machine for sand papering flanged spools, comprising a frame with means for holding and rapidly rotating a spool, a swinging rack, a movable carriage thereon, rollers upon the carriage between which a strip of sandpaper is adapted to be fed, a ratchet wheel fixed to one roller, a pawl engaging said wheel, horizontally movable carriages, rollers arranged in pairs upon the latter, ratchet feed mechanism for rotating one roller of each pair, cam mechanism for moving said rack and the carriages, and means for imparting reciprocating movements to the carriages while the spool is being sand papered.

12. A machine for sand papering flanged spools, comprising a frame with means for holding and rapidly rotating a spool, a swinging rack, a movable carriage thereon, rollers upon the carriage between which a strip of sand paper is adapted to be fed, a rotatable shaft, a cam wheel thereon, a lever fixed at its upper end to said rack, a spring actuated bar to which said lever is pivoted and actuated by said cam wheel, and means for imparting a longitudinal reciprocating movement to said rollers, a sand paper holder on said carriage, horizontally movable carriages and rollers arranged in pairs thereon, sand paper holders upon said horizontally movable rollers, and means for moving the latter towards a rotating spool, and mechanism for imparting reciprocating movements to the rollers on the horizontally movable rollers.

13. A machine for sand papering flanged spools, comprising means for holding and rapidly rotating a spool, a swinging rack, a carriage mounted thereon, clamping members thereon, and a rubber block engaged by said members, means for imparting a reciprocating movement to the carriage, cam mechanism for moving the rack, horizontally movable carriages, rollers arranged in pairs thereon, cam means for moving the carriages on which the latter are mounted, means for causing the horizontally movable carriages to swing toward each other in pairs to cause the sand paper holders thereon to frictionally engage the opposite faces of the flange of a spool.

14. A machine for sand papering flanged spools, comprising means for holding and rapidly rotating a spool, a swinging rack, a carriage mounted thereon, clamping members thereon, and a rubber block engaged by said members, means for imparting a reciprocating movement to the carriage, cam mechanism for moving the rack, horizontally movable carriages, rollers arranged in pairs thereon, cam means for moving the carriages on which the latter are mounted, means for causing the horizontally movable carriages to swing toward each other in pairs to cause the sand paper holders thereon to frictionally engage the opposite faces of the flanges of a spool, and means for imparting a reciprocating movement to the pairs of carriages when the paper holders thereon are in frictional contact with the spools.

15. A machine for sand papering flanged spools, comprising means for holding and rapidly rotating a spool, a swinging rack, a carriage mounted thereon, clamping members thereon, and a rubber clock engaged by said members, means for imparting a reciprocating movement to the carriage, cam mechanism for moving the rack, horizontally movable carriages, rollers arranged in pairs thereon, cam means for moving the carriages on which the latter are mounted, means for causing the horizontally movable carriages to swing toward each other in pairs to cause the sand paper holders thereon to frictionally engage the opposite faces of the flanges of a spool, resilient rods each fixed to a stationary part of the apparatus, an anti-friction roller mounted on each rod, and a member on each of the horizontally movable carriages adapted to contact with the anti-friction wheel, to cause the carriages arranged in pairs to swing laterally to cause the holders on the latter to frictionally engage the opposite faces of the flanges of the spool.

16. A machine for sand papering flanged spools, comprising means for holding and rapidly rotating a spool, a swinging rack, a carriage mounted thereon, clamping members thereon, and a rubber block engaged by said members, means for imparting a reciprocating movement to the carriage, cam mechanism for moving the rack, horizontally movable carriages, rollers arranged in pairs thereon, and means for moving the carriages on which the latter are mounted, means for causing the horizontally movable carriages to swing toward each other in pairs to cause the sand paper holders thereon to frictionally engage the opposite faces of the flanges of a spool, resilient rods each fixed to a stationary part of the apparatus, an anti-friction roller mounted on each rod, and a member on each of the horizontally movable carriages adapted to contact with the anti-friction wheel to cause the carriages arranged in pairs to swing laterally to cause the holders on the latter to frictionally engage the opposite faces of the flanges of the spool, and cam and lever mechanism for imparting a rapid reciprocating movement to the horizontally movable carriages while the flanges of the spool are being sand papered.

In testimony whereof I hereunto affix my signature.

NAPOLEON DEMERS.